(12) United States Patent
Kerr

(10) Patent No.: US 9,319,373 B1
(45) Date of Patent: Apr. 19, 2016

(54) SOCIAL NETWORKING GAME WITH PRIORITIZED MESSAGE QUEUE

(71) Applicant: Monty Kerr, Austin, TX (US)

(72) Inventor: Monty Kerr, Austin, TX (US)

(73) Assignee: Playstudios, Inc., Las Vegas, NV (US)

( * ) Notice: Subject to any disclaimer, the term of this patent is extended or adjusted under 35 U.S.C. 154(b) by 404 days.

(21) Appl. No.: 13/831,903

(22) Filed: Mar. 15, 2013

Related U.S. Application Data

(60) Provisional application No. 61/611,466, filed on Mar. 15, 2012.

(51) Int. Cl.
| | |
|---|---|
| *G06F 15/16* | (2006.01) |
| *H04L 12/58* | (2006.01) |
| *G06Q 10/10* | (2012.01) |
| *G06F 12/00* | (2006.01) |

(52) U.S. Cl.
CPC .............. *H04L 51/32* (2013.01); *G06Q 10/107* (2013.01)

(58) Field of Classification Search
CPC ......... A63F 13/12; A63F 13/10; G07F 17/32; G07F 17/3227; G07F 17/3237; G07F 17/3255; G06F 15/16

USPC .......................................................... 709/206
See application file for complete search history.

(56) References Cited

U.S. PATENT DOCUMENTS

| | | | |
|---|---|---|---|
| 8,137,194 B1 * | 3/2012 | Kelly et al. ..................... 463/31 |
| 8,366,550 B2 * | 2/2013 | Herrmann et al. .............. 463/42 |
| 2006/0148551 A1 * | 7/2006 | Walker et al. ................... 463/16 |
| 2009/0170611 A1 * | 7/2009 | Herrmann et al. .............. 463/43 |
| 2010/0077041 A1 * | 3/2010 | Cowan et al. ................. 709/206 |

* cited by examiner

*Primary Examiner* — Zarni Maung
(74) *Attorney, Agent, or Firm* — Muskin & Farmer LLC

(57) ABSTRACT

A method, apparatus, and computer readable storage to implement a social networking game that enables a game server to prioritize application to user messages. A return on investment (ROI) can be computed for each potential application to user message and the application to user messages can be delivered in an order based on the computed ROI for each message. The ROI for each message can be computed based on factors such as the value of a message's recipient and/or the importance of the message. The value of a message's recipient can be based on factors such as the amount of money that recipient has spent on the game, how many friends the recipient has, how many invitations the recipient has sent to other potential players, and any other factors that are probative as to the value of the recipient to the commercial success of the game.

19 Claims, 6 Drawing Sheets

US 9,319,373 B1

SOCIAL NETWORKING GAME WITH PRIORITIZED MESSAGE QUEUE

CROSS REFERENCE TO RELATED APPLICATIONS

This application claims benefit to U.S. provisional application 61/611,466, which his incorporated by reference herein in its entirety.

BACKGROUND OF THE INVENTION

1. Field of the Invention

The present general inventive concept is directed to a method, apparatus, and computer readable storage medium directed to a prioritized messaging system for a game that can be played on social networking sites.

2. Description of the Related Art

Social networking sites (e.g., FACEBOOK) can host applications (e.g., FARMVILLE, WORDS WITH FRIENDS). Messages can be sent to users of those applications. Some social networking sites may limit the amount of messages that can be delivered in order to reduce what might be considered spam.

What is needed is a way to help mitigate the effect of the restrictions of sending messages on some social networking sites.

SUMMARY OF THE INVENTION

It is an aspect of the present invention to enable an intelligent messaging system.

The above aspects can be obtained by a method that includes (a) determining a plurality of application to user messages each with an intended recipient; (b) computing a score for each of the plurality of application to user messages; and (c) delivering an approved subset of the plurality of application to user messages but not a remaining set of the plurality of application to user messages, the approved subset not comprising all of the plurality of application to user messages, the approved subset determined based on each messages respective score.

The above aspects can also be obtained by a method that includes (a) determining a plurality of application to user messages each with an intended recipient; (b) computing a score for each of the plurality of application to user messages; (c) ranking the plurality of application to user messages based on their respective score; and (d) delivering the plurality of application to user messages in an order based on the ranking.

The above aspects can also be obtained by a system that includes (a) a network connection; and (b) a server connected to the network connection, the server configured to: (c) determine a plurality of application to user messages each with an intended recipient; (d) compute a score for each of the plurality of application to user messages; (e) rank the plurality of application to user messages based on their respective score; and (f) delivering the plurality of application to user messages in an order based on the ranking.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
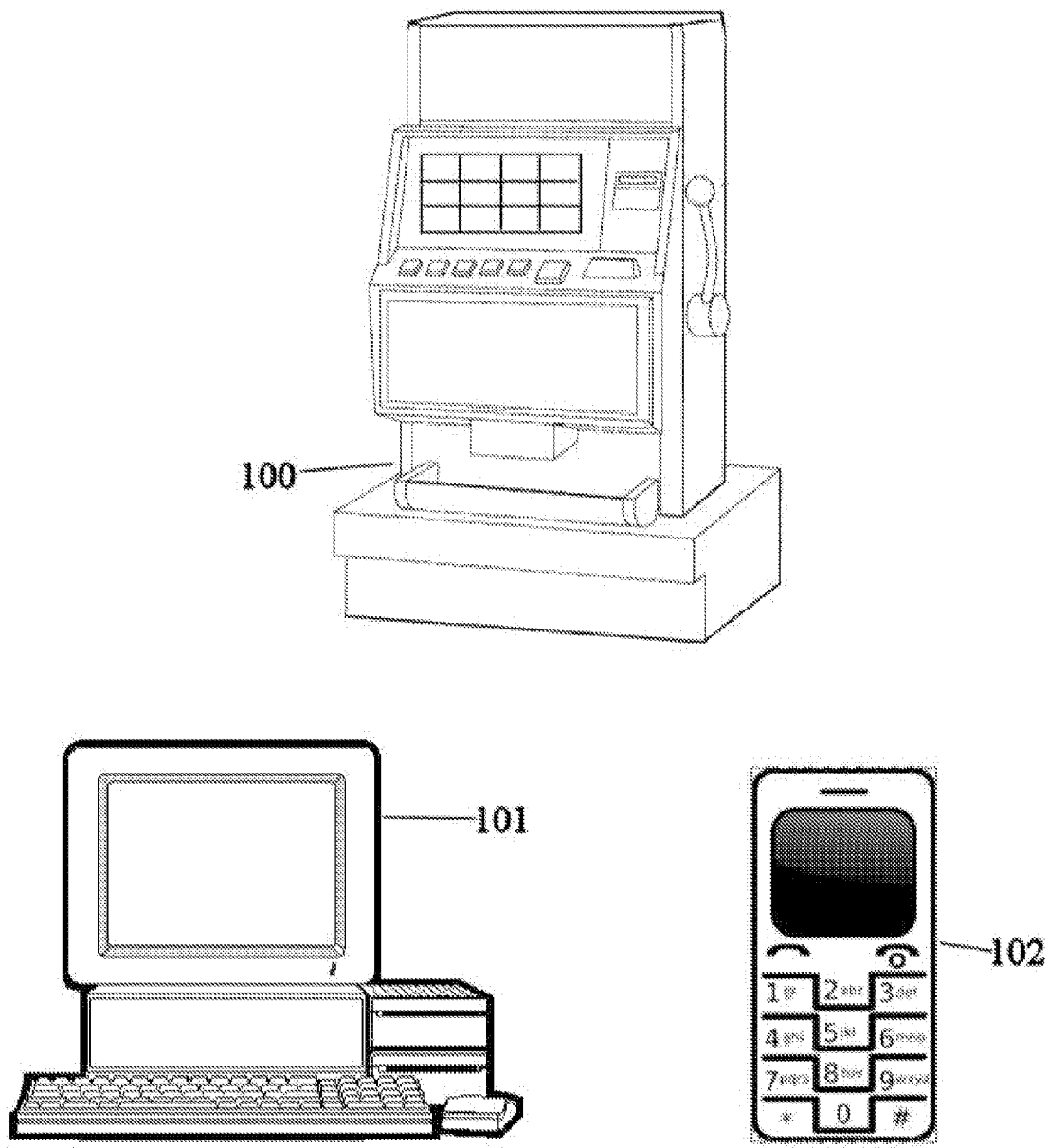
FIG. 1 is a drawing illustrating numerous apparatuses that can play the game described herein, according to an embodiment.

Reference will now be made in detail to the presently preferred embodiments of the invention, examples of which are illustrated in the accompanying drawings, wherein like reference numerals refer to like elements throughout.

The present inventive concept relates to a game that can be played on a social networking site such as FACEBOOK (including what is described in U.S. Pat. No. 7,669,123 which is incorporated by reference herein in its entirety), MYSPACE, or any other site which maintains a database of users and provides an interface for interaction.

The inventive concept relates to an application system operating in an environment which limits a number of application to user messages it is able to send. The system can analyze and compute a return on investment (ROI) for each message so that a message queue can be prioritized. In this manner, the more important messages can be sent while the less important messages may not be sent.

FIG. 1 is a drawing illustrating numerous apparatuses that can play the slot machine game described herein, according to an embodiment.

The game described herein can be played on an electronic gaming machine 100 that can found in brick and mortar casinos or other venues such as internet cafes, etc. Cash (or cashless vouchers) can be inserted into the machine 100 using a bill acceptor which credits the machine with a respective amount of credits which can then be used to play the game, and winnings are paid out in the form of credits which can then be cashed out for cash or a cashless voucher that can be redeemed for cash. The game described herein can exist on a software module pre-installed on the slot machine 100 or can be downloaded to the electronic gaming machine 100 from a central remote server.

The game described herein can also be played on a computer 101 such as a personal computer, laptop, etc. The game can be downloaded to the computer 101 and stored locally on the computer 101. Alternatively, the computer 101 can have an internet connection (not illustrated) so that the game can be served from a remote location and player and displayed on the computer 101. For example, the game can be played on an online casino (wherein the player can wager for real money using a credit card or other deposit method, where legal) in which the results are determined on a remote server and transmitted to the computer 101 so that the computer displays the results. The game can also be played on the computer 101 for "casual play" on a social networking site (e.g., FACEBOOK, MYSPACE, etc.) wherein the game software can be launched from within the social networking site itself "Casual play" is where the game can be played not for real money but for credits which typically have no cash value, but can have other benefits to the player.

The game described herein can also be played on a cell phone 102 or any other type of portable device, such as a tablet computer, etc. The portable device can implement any of the paradigms described above with respect to the computer 101 (e.g., online casino, social networking site, etc.)

The ability to send messages using a social networking web site (e.g., FACEBOOK) is known in the art and is described in U.S. patent publication 2010/0049852, which is incorporated by reference herein in its entirety. Social networking sites also may restrict the use of messaging in order to preserve resources and restrict any inconvenience to the users of having to review an excess amount of messages.

Figure 2:
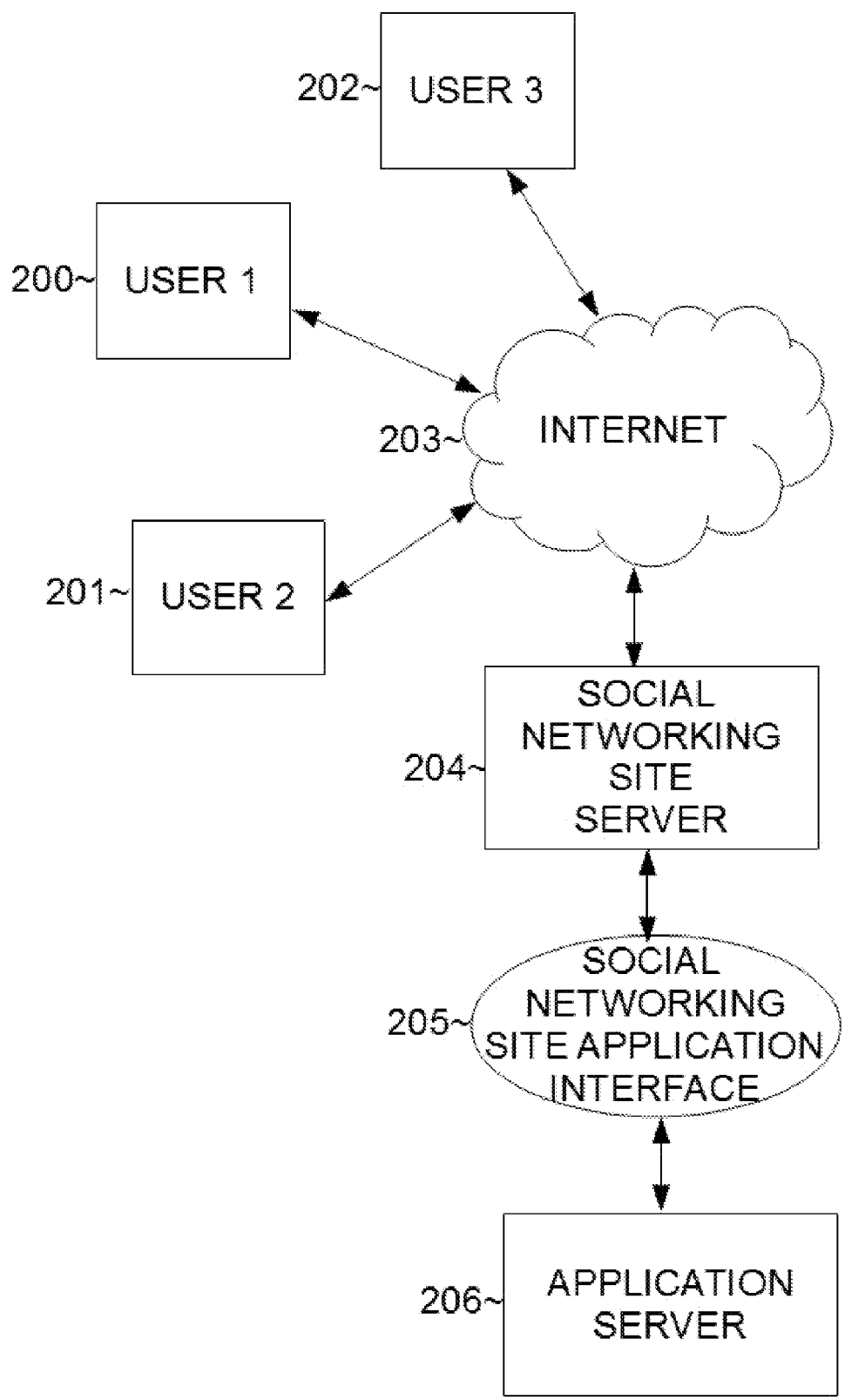
FIG. 2 is a block diagram illustrating components of a social networking structure, according to an embodiment.

FIG. 2 is a block diagram illustrating components of a social networking structure, according to an embodiment. Of course, FIG. 2 illustrates one example of a configuration but other configurations can be utilized as well.

A computer communications network such as the internet 203 is used to communicate to/from user 1 200, user 2 201, user 3 202 (of course there can be many more unique users, even thousands or millions). Each user is typically using a personal computer (which can also include a laptop, portable computing device, etc.).

A social networking site server 204 (e.g., can be hosting FACEBOOK or any other social networking site) communicates with the user 1 200, user 2 201, and user 3 202 through the internet 203. The social networking site server 204 performs all of the functions that a social networking site would perform (e.g., maintain friends, serve photos, communicate messages, etc.) It is noted that the social networking site server 204 is typically more than one server on a distributed system but is showed herein as a single server for simplicity (in fact any of the components illustrated herein are shown as a single component for simplicity but may in fact exist as multiple servers/components across several locations as a distributed system).

A social networking site application interface 205 is a layer that can receive communications from an application server 206 and process them appropriately and transmit them to the social networking site sever 204, as well as receiving communications from the social networking site server 204 and process them appropriately and transmit then to the application server 206. The application server 206 cannot typically communicate or interact directly with the users (user 1 200, user 2 201, user 3 202) but communicates to the users indirectly via the social networking site server 204. The application server 206 is a server which can be hosted separate from FACEBOOK and can serve an application (e.g., a game, advertising application, etc.) Thus, the application server 206 can store and execute all of the software that can implement a game and communicates occurrences that happen inside the game to the social networking site server 204 via the social networking site application interface 205.

Embodiments of the present inventive concept involve when messages are transmitted between users and between an application (which can be hosted by the application server 206) and a user. A message from one user to another user (a "user to user message" or "U2U message") can be transmitted using the social networking site server directly from one user to another. For example, a message (not using an outside application server) from user 1 200 to user 2 201 can be transmitted by user 1 200 indicating his/her desire to send a direct message to user 2 201 (and the contents of the message) to the social networking site sever 204, upon which the social networking site server 204 will deliver the message to user 2 201 (using such mechanisms as a private message, wall post, etc.)

User 1 200 may want to send a message to user 2 201 from within an application hosted by the application server 206. This can be for example, if the user 1 200 wants to invite user 2 201 to the application (e.g., a game), or user 1 200 wants to give user 2 201 a gift inside the game (e.g., free spins on a slot machine, free credits to play with, an inventor item, etc.) This user to user message from within an application can be accomplished as follows. The application may prompt user 1 200 to send a message to a friend (upon which user 1 200 can pick out user 2 201 as the recipient) or user 1 may completely initiate the message independently. The message can be, for example, "Joe has sent Bill five free spins at the Lucky Fortune Casino" (where "Joe" is user 1 200 and "Bill" is user 2 201) which is delivered to user 2 201. The Application server 206 can communicate with the social networking site server 204 through the social networking site application interface 205 the message information (comprising the content of the message, the sender, the recipient, and any other related information about the message). The social networking site server 204 would then deliver the message to user 2 201 (by sending user 2 201 a private message, wall post, status update, or any other deliver mechanism). The message may also contain a link which when clicked would bring the recipient (user 2 201) to the application so that the user 2 201 can then immediately redeem the free spins (or redeem any other gift contained in the message).

Another type of message is an "application to user" message which is not originated from a user (which is a human) but originates automatically from the application running on the application server 206. For example, an application running on the application server 206 is programmed to send automated messages to all users of the application (of course all users of the application and their personal information are maintained by a database running in conjunction with the application server 206). For example, if the application running on the application server 206 is an online casual play casino, the application server 206 can be programmed to once a week send an automated message to all players that have ever played at the casino (i.e., used the application running on the application server 206), the message for example being, "please play at the Lucky Fortune Casino in the next 24 hours and receive 20 in free credits for pay on our slot machines!" This application to user ("A2U") message can be accomplished by the application server 206 generating a new message for each intended recipient of the message (e.g., each player that has ever played at the "Lucky Fortune Casino"—the application running on the application server 206). Each newly generated message can then be transmitted to the social networking site server 204 (via the social networking site application interface 205) with all of the relevant message information (e.g., message content, sender, recipient, application the message was generated from, etc.) so that the social networking site server 204 would then deliver each message to its respective recipients.

Figure 3A:
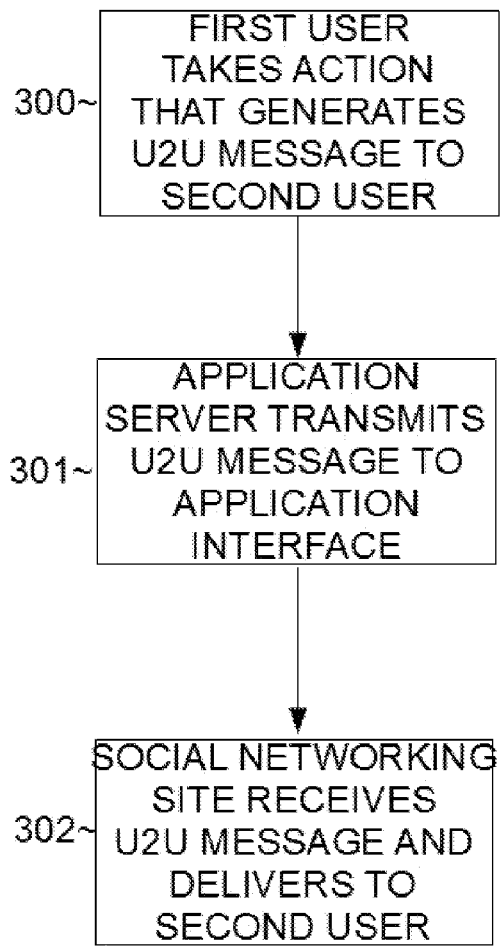
FIG. 3A is a flowchart illustrating an exemplary method of generating a user to user message and an example, according to an embodiment.

FIG. 3A is a flowchart illustrating an exemplary method of generating a user to user message and an example, according to an embodiment.

The method can begin with operation 300, wherein a first user (a sender) takes an action inside a game (or other application) that would initiate a user to user message to a second user (a recipient). This action can be for example, after being prompted with an offer of a gift (e.g., free spins, free credits, an inventory item, etc.) the first user can indicate the second user (e.g., by clicking the second user's name, icon, typing the second user's name, etc.)

From operation 300, the method proceeds to operation 301, wherein the application server (e.g., game server) generates and transmits the user to user message to the application interface for the social networking site. This can be done in accordance with the particular protocols used for the application interface. Typically, social networking sites (e.g., FACEBOOK) would publish their protocols and developers kits so that one of ordinary skill in the art would easily be able to program the application server 206 to communicate with the application interface in order to accomplish a desired task with the social networking site server 204 (e.g., FACEBOOK server).

From operation 301, the method proceeds to operation 302, wherein the social networking site (e.g., the server) receives the message from the application server (via the application interface) and actually delivers the message to the second user.

An example of a user to user message 303 is, 'Lucky Fortune Casino—You have 1 message: from Joe Smith—"I sent you 5 free spins Click here to accept"' It is clear that the message was sent (or initiated) by Joe Smith (the sender). The recipient's name is not included in this message although it optionally can be. Clicking the link (or pressing the button, etc.) will automatically launch the application (the Lucky Fortune Casino) and enables Joe Smith (the recipient) to collect his free spins and play them.

Figure 3B:
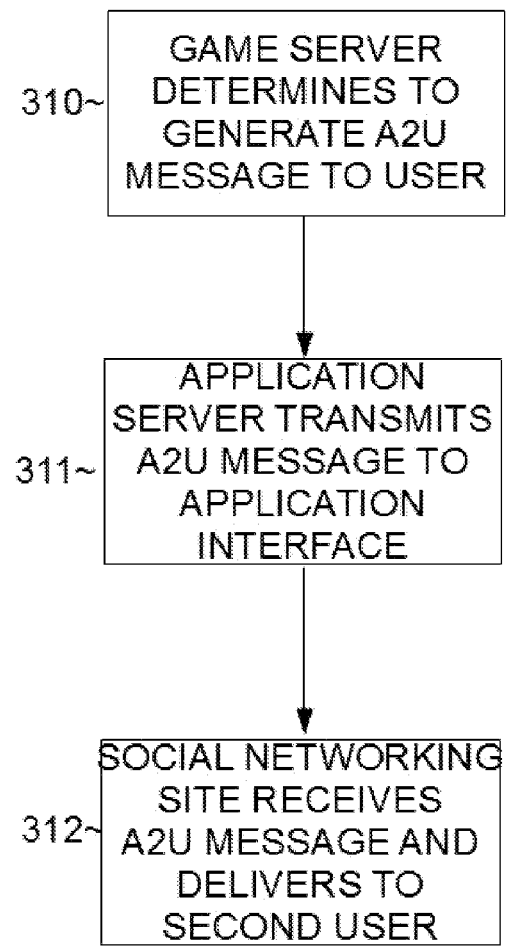
FIG. 3B is a flowchart illustrating an exemplary method of generating an application to user message and an example, according to an embodiment.

FIG. 3B is a flowchart illustrating an exemplary method of generating an application to user message and an example, according to an embodiment.

The method begins with operation 310, wherein an application running on an application server determines to generate an application to user ("A2U") message from the application to a recipient user. The application can be programmed to generate such a message by the system designers in accordance with the commercial and other goals of the application. Examples of application to user messages can be: a message can be (periodically) generated for all players of a game inviting them to return to the game for a free prize; a message can wish all players of a game a happy birthday (on their birthday); a message can be send to a certain subset of players of the game (e.g., those players that have spent real money in the game) offering them a free spin of a slot machine; a message can inform a player of a current event happening in the game (e.g., their character is about to die). Code in the application can be executed which generates automatic messages at certain periods (e.g., one a day, once a week, etc.) while some automatic messages would be generated on the fly as needed (e.g., when a triggering event happens in the game which requires an application to user message to be sent).

From operation 310, the method proceeds to operation 311, wherein the application server transmits the application to user message to the application interface. This can be done similarly to operation 301, although the protocol may be different for an application to user message than a user to user message. For example, an application to user message may have to (depending on the requirements of social networking site) identify itself (the application), confirm that it has the permission to send an application to user message (e.g., by providing a pointer/verification of the permission the recipient user gave to the social networking site to authorize the application to user message), etc.

From operation 311, the method proceeds to operation 312, wherein the social networking site receives the application to user message and delivers it to the recipient user. This can be done as described herein and similar to operation 302, although application to user messages may be displayed differently than user to user messages. Typically, application to user messages would be displayed to the player with clear identification that the application to user message has been generated by an application (as opposed to a user to user message which should clearly identify that the message was initiated by another user).

An example of an application to user message 313 is "Lucky Fortune Casino—You have been chosen at random to receive a seat at our final poker table. Click here to play." This message is not initiated by another user and thus the message does not indicate another user's name as the sender. The message does indicate the application (Lucky Fortune Casino) which is the sender. This message is generated automatically, for example, the application server determines a set of players (e.g., a random set, all known players, all valued players (e.g., who have spent money or referred a predetermined number (>0) of friends), etc. and sends the same message application to user message 313 the entire set of players. Clicking the link (or pressing the button, etc.) will automatically launch the application (the Lucky Fortune Casino) and enables Joe Smith (the recipient) to play at the final poker table.

It is noted that sometimes the social networking site server may limit the amount of application to user messages that an application can send. For example, the social networking site may give a particular application X (e.g., 1,000) application to user messages per day (or per hour, per week, etc.) The reason that the social networking site may limit the number of application to user messages is because to give an application the ability to send unlimited number of messages could be considered "spam" and could be a nuisance to uses. Thus, the social networking site (via the social networking site server) would typically give each application a particular number of application to user messages ("buckets") per time duration that the application can use as the application sees fit. The number of application to user messages that the social networking site may allow for an application may be variable based on each application's own unique characteristics (e.g., number of registered users of that application, etc.)

An application may desire to send more application to user messages than it is allowed to. Thus, the application should prioritize its application to user messages so that the most important (or valuable) application to user messages would be delivered while the less important application to user messages could be discarded (or delivered at a later time). The application can generate a queue of application to user messages and then determine a numerical score of each message based on the messages "return on investment" (ROI) and rank the messages in order of their score and deliver the messages in the rank order until the application's quota of application to user messages is used up.

The ROI is an estimated value of each message. An application typically has commercial goals to achieve, which typically entails generating cash revenue. Thus, certain messages may be considered to have a better return (which could translate into more cash earned for the application, more users who use the application, etc.) and should be prioritized over messages which have a relatively lesser return. The "investment" is the sending of a message which uses one of a limited number of available application to user messages. For example, consider a situation where player A typically spends $50 cash on a game per week and player B has never spent any cash on the game, and an application only has one application to user message left (e.g., "please play today and you will receive a free spin") which is to be sent to either player A or player B. Of course, the application would be better off sending the message to player A since (based on the history) player A would be more likely to monetize (spend cash) than player B.

One step in determining a message's ROI is to determine a value of the message's (technically a potential message since it has not been sent yet) intended recipient. Of course, the more valuable the recipient to the application the more likely the recipient will be to act favorably upon the message (e.g., click the link in the message and spend money in the application). A recipient's value to the application can be computed in a numerical score referred to herein as loyalty points. Loyalty points are a numerical score computed for each user of an application (e.g., player of a game) and represent a value of the user to the application. A user with a higher number of loyalty points is more likely to spend cash at the application, refer friends to the application, etc.

Loyalty points are points that players can earn by their activity on and related to the site. In general, loyalty points are a measure of the value of a player to the site (the more points a player has means the player is more valuable to the site). Examples of ways loyalty points can be earned by a player include: 1) Referring friends to the site (the player can identify a friend to the site (either their email address or clicking their name) and if this friend signs up with the site, this can be considered a referral). Or, a referral can be considered an initial referral from a player to his friend(s) regardless of whether those friends actually sign up with the site. A player can receive a predetermined amount of points per referral (e.g., 20 loyalty points per referral), or a player can receive a predetermined amount of loyalty points per a number of referrals (e.g., when a player refers 10 friends the player gets 100 loyalty points). 2) As an add-on to earning loyalty points based on a number of friends referred, loyalty points can also be determined based on the "quality" (or "value") of those friends. For example, if player's referred friends have a good average "quality" (they play on the site a lot, refer others, spend cash on the site, etc.) then the player would earn more loyalty points because the quality/value of this player's referrals are good. This can be quantified by taking an average of loyalty points of a player's friends and awarding the player this average in additional loyalty points (the average can optionally be multiplied by a constant or other variable). In other words, the quality of a player's referrals can be measured by each of their respective number of loyalty points, and this quality can be used in order to help the player earn additional loyalty points. Of course the better quality of a player's referrals the more additional loyalty points the player will earn, while a worse qualify of a player's referrals the less additional loyalty points the player will earn. The quality (also referred to as value in this context) of a player's referrals can be measured using other mechanisms besides loyalty points, for example, summing the number of referrals of each of the player's referrals; summing a total of cash purchases of the player's referrals; or quantifying any other factor described herein that would measure the quality/value of a player's referrals. For example, Joe referred ten friends who on the average referred two friends each (for a total of 20 new referrals), and Bob referred 3 friends who on the average referred 10 friends each (for a total of 30 new referrals), Bob (if the metric were simply the number of referrals of referrals) would be more valuable to the site than Joe (and in an embodiment Bob would be awarded more loyalty points (e.g., 30 points) than Joe (20 points) if loyalty points were solely measured on referrals of referrals). In a further embodiment, loyalty points can be based on (or incorporate) a player's total derivative referrals (e.g., referrals, referrals of those referrals, and so on). "Derivate referrals" refers to every player who is referred to the site that would not be registered users of the site (assuming they would not have found the site independently) but for the player's entire network of referrals (e.g., Bob's derivative referrals are all of Bob's referrals plus all of Bob's referral's referrals plus all of Bob's referral's referral's referrals, and so on).

Similar to referrals, "derivative cash" is total cash spent on the site by a player's derivative referrals. For example, if all of Joe's derivative referrals spend a total of $2,300 (Joe's derivative cash) in cash on the site, and all of Bob's derivative referrals spend a total of $1,000 (Bob's derivative cash) on the site, then Joe could be considered to have more value to the site than Joe. Loyalty points can be based (or incorporate) a player's derivative cash. In an embodiment, a player can receive loyalty points based on a percentage (e.g., 1%) of that player's derivative cash.

Further ways loyalty points can be earned are: 3) Spending at least a predetermined minimum of time playing games on the site (e.g., if a player spends 50 hours (does not need to be consecutive) playing games (or a particular game) on the site, the player would receive 100 loyalty points). 4) Achieving a particular outcome in a game on the site (e.g., if a player completes a particular level of a hidden object game, the player will earn 25 loyalty points). 5) Purchasing a product advertised on the site (and purchasing it through the site) would earn the player loyalty points, e.g., if a book is advertised on the site and the player purchases the book (clicking the link on the site) using cash, the player can earn 5 loyalty points (or the loyalty points earned can be a percentage of the price of the book, e.g., the player can earn 5% of a purchase price in loyalty points so that buying a book costing $50 will earn the player 2.5 loyalty points).

Players can also earn loyalty points by taking actions that enhance the value of the product. Loyalty points can be given for sharing in-game events (e.g., clicking a "share" button on a notification which shares a current game outcome with some or all of their friends). The following factors can be used in determining a number of loyalty points to award: A) frequency of share—the more times a player shares, the more loyalty points they would get (e.g., 2 loyalty points per share). There can be a diminishing return for sharing too frequently, e.g., after 10 shares the player would get 1 loyalty points per share (instead of 2). B) Recency of share—the player could get loyalty points based on how recently they shared. There is a diminishing return for sharing too recently; C) Audience size—the player could get loyalty points based on the size of the player's social graph The more friends a player has, the more loyalty the player generates for sharing (e.g., after sharing an outcome, the player earns 0.1 loyalty point per friend the player has (rounded to the nearest loyalty point). D) Expected value—A player with a higher response rate (from the player's friends who can post their responses to the player's message or share) for his messages generates more loyalty per share. For example, a player who gets an average of two responses for the player's messages gets more loyalty points than a player who gets an average of one response for the player's messages (e.g., the number of loyalty points equals 2*the average number of responses the player's messages (e.g., status updates, shares, etc.)

Another way a player can earn loyalty points is by posting achievements or game scores to the games ticker (or news feed or any publicly viewable feed). For example, if the player reaches a particular level in a game (or received a particular outcome) and the player agrees to post the achievement (to his wall, broadcast to the player's friends, etc.) the player will receive additional loyalty points. The same rules discussed above for sharing events can be applied here (e.g., diminishing returns for sharing too frequently, etc.)

Another way a player can earn loyalty points is by when they send invitations (to join the game) and the recipients of those invitations result in some type of positive action by the invitee (merely a player spamming his/her friends typically should not generate additional loyalty points although in another embodiment it can). For example, when the invitees join the player can receive a loyalty point (or multiple of a loyalty point) for each invitee that joins the game.

Another way a player can earn loyalty points is by giving gifts to their friends and receiving gifts back. For example, each gift the player receives back from a friend (that the player sent a gift to) can earn the player a loyalty point. Loyalty points can even be one of the gifts that a player can give (and receive) from/to their friends.

Another way a player can earn loyalty points is by using the "like" function on FACEBOOK (or similar function on any other social networking site). If the player "likes" a game page, the player can receive a number of loyalty points. Similarly, if the player leaves a review for the game (on the game server or another site) the player will receive loyalty points for the leaving the review.

Another way a player can earn loyalty points is based on the amount and quality of play (not the results of play) by the player. Factors that can be used in determining the amount of loyalty points can include: A) frequency of play—if the player returns to the game regularly, this can generate additional loyalty points. If a player returns every day (or multiple times per day), the player generates loyalty faster than a player that has large gaps between sessions. For example, a player who players at least once per day for a week earns 20 additional loyalty points, while a player who plays five to seven times in a week earns 15 additional loyalty points, while a player who plays less than five times in a week earns no additional loyalty points based on this metric. This award (for example) can be computed/award once at the end of each week. B) recency of play—the time since the player's last playing session can impact the amount of loyalty points the player earns. For example, if it has been more than 24 hours since the player's last playing session the player would not earn additional loyalty points based on this metric. If the player returns to the game from 12 to 24 hours since the player's last playing session the player would earn 5 additional loyalty points. If the player returns to the game less than 12 hours from the player's prior playing session the player would receive 10 additional loyalty points. There can be a time minimum (or other play requirement) of each return to the game so the player cannot game the system by continuously returning to the game just to receive points. C) duration of play—the amount of time invest by the player in the game can also affect the number of loyalty points granted. A player who has invested more time in the game would receive more loyalty points. For example, a formula such as: additional loyalty points equal hours in game*0.25 (or any other constant).

Another factor that can be used in determining an award of loyalty points it monetization, in that players that monetize (spend cash) more often would generate loyalty points faster than players that do not monetize. Factors can include: a promotional bonus—loyalty points can be awarded directly based on purchases, for example, the player receives 10 loyalty points for every $10 cash the player purchases in the game.

Another way players can earn loyalty points is when the player engages in offers from the game or through in-game advertising. For example, if the player clicks an ad in the game and makes a purchase based on the ad, the player can earn additional loyalty points. In an embodiment, if the player clicks an ad and watches a video, the player can earn loyalty points even if the player does not actually buy anything.

One example of a "master formula" for determining a number of loyalty points awarded to a player can be as follows:

$$\text{Loyalty points}=(2*N+4*S+P*7+C*2+Q*4)/19.$$

wherein N=number of friends referred, S=number of those friends that have actually registered with the site, P=amount of cash purchases made by the player, H=number of hours the player has played on the site, C=number of links on the site the player has clicked, Q=average number of loyalty points of the friends referred that have registered with the site. This is of course just one example, and any other formula can be used to determine loyalty points. In an embodiment, instead of a composite value for loyalty points (as described above), different values (types) of loyalty points can be maintained for each player (e.g., one value of loyalty points based on the player's friends, another value of loyalty points based on the player's activity) and these can be used in any manner described herein. A loyalty point amount can be computed from only one factor up (e.g., solely based on a number of friends referred) to a composite of any number of factors (including any combination of factors discussed herein or others not discussed).

Different types of messages may each have a different priority to the application. For example, a game can be running in the background whether or not the player is actually playing at the time. For example, a game can have a virtual city which has "virtual people" which carry out actions inside the virtual city. Actions or occurrences may take place in the virtual city which occur without direction by the player (also referred to herein as user) and it may be important for the player to be notified of the occurrence. For example, a hurricane may be approaching the virtual city and the player's virtual city is going to be completely destroyed unless the player takes a particular action (e.g., installs building supports throughout the entire city to withstand the hurricane). It is important that a message be received by this player (e.g., "a hurricane is approaching your city—you need to hurricane proof your city by tomorrow or the entire city will be destroyed.") This type of message may have a high priority. A more general message may have a lower priority (e.g., "you haven't played in a while, please sign into the game and receive a free spin on a slot machine").

Therefore, in addition to a player's (recipient's) value (measured in loyalty points), another factor involved in determining a message's ROI is a priority (or type) of the message that is intended to be delivered to the player. Different types of messages would have different priorities (or values) as well. Message types can be given a numerical score (e.g., 4 for the most important message, 3 for the next-most important messages, 2 for the next most important messages, and 1 for the least most important messages). Application to user messages can be broken into different categories or message types based on the content therein.

Thus, in addition to determining a player's value (measured by loyalty points which also can be referred to herein as player value points), a priority of the message type can be determined (based on the content of the message or how it was generated). Using at least these two factors, a ROI is determined for each message. Messages can then be sent (or not) based on the ROI for a set of messages. In this manner, since a limited number of user to application messages are allowed, the most important messages can be sent while the lesser important messages may not be sent.

Figure 4:
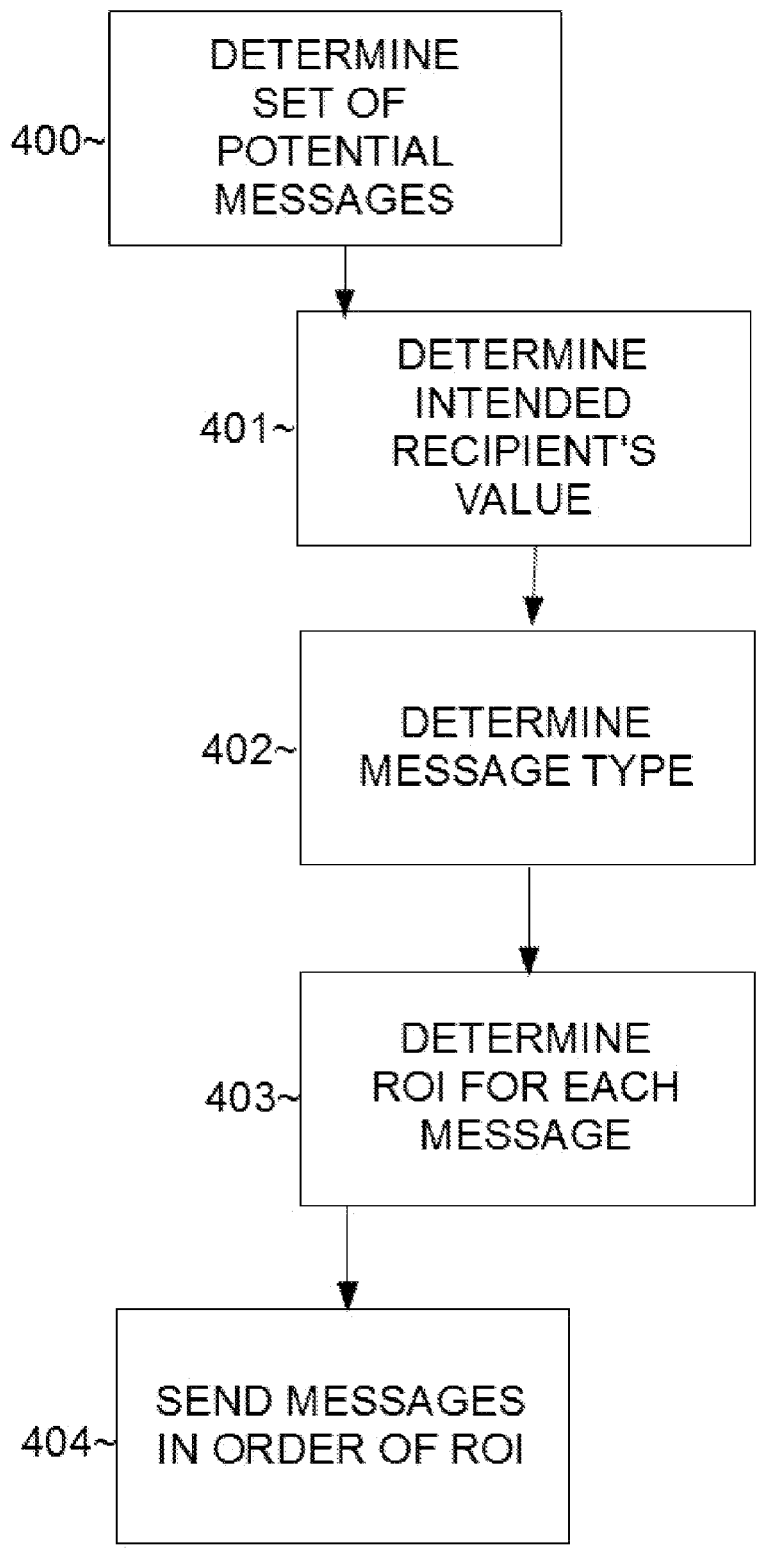
FIG. 4 is a flowchart illustrating an exemplary method of delivering messages in a priority order, according to an embodiment.

FIG. 4 is a flowchart illustrating an exemplary method of delivering (application to user) messages in a priority order, according to an embodiment.

The method can begin with operation 400, which determines set of potential messages. The set can be generated all contemporaneously, or messages can be generated piecemeal and added to the set. The set is "potential messages" because it is not known which messages will be sent and which will not be.

For each message in the set of potential messages, operations 401 to 403 are performed (which is why they are shown off to the side)

In operation 401, a message's intended recipient's value is computed. This can be done as described herein, for example determining the number of loyalty points the intended recipient has.

From operation 401, the method proceeds to operation 402, which determines a message type priority. This can also be done herein. There may be a limited number of types of messages and each type of message may be assigned a discrete category number (or type number), for example from 1-3 (or 1-4, etc., any number of categories can be used). In one embodiment, each numerical type number comprises messages that are identical or very similar in content. In an embodiment, message types are based on the circumstances they were generated. For example, if an in-game occurrence occurs that is important that the player know about (e.g., the hurricane example above), this can be given the most important category (e.g., category/type 4). For messages that may be important (but not critical) to the player's game (e.g., "all day today players of the game can get 50% off discounts on the cost of new buildings") a lower category (e.g., 3) can be assigned. For less important messages that are more generic in nature, "you have been awarded a free spin") this can be assigned a lower category (e.g., 2). For the least important messages, "please come back and play, you haven't played in a while" this can be assigned the lowest category (e.g., 1). Or there can simply be two categories (types) of messages, 1 (less important) and 2 (more important). When a message is generated, each type of message can be pre-assigned a priority (type).

From operation 402, the method proceeds to operation 403, which determines a return on investment (ROI) for each message. The ROI can be determined based on at least a combination of the intended recipient's value and the message type priority. For example, a composite formula can be devised such as the following:

$$R = x*L + y*T,$$

wherein R=ROI, L=loyalty points, T=type, x=weight, y=weight.

Thus, for example, if the loyalty points are scaled from 1 to 100, and T is either 1 (less important) or 2 (more important), and x=0.1 and y=2, then if L=50, Y=1, T=1, then R=7. Note the weights (x, y) can be set somewhat arbitrarily by the system designers. A return on investment (ROI) should be computed for each potential message in the set of potential messages determined in operation 400. The ROI is an overall numerical score which reflects the value of that particular message. Typically, a higher score is better although in another embodiment the scoring system can be devised such that a lower score is better.

After the scores are determined, then in operation 404 it is determined which messages should actually be sent based on the ROI scores for the messages in the set of potential messages. This can be done in numerous ways.

In a simplest method, all messages with a ROI score over a certain threshold would be sent while all messages that are not over the certain threshold would not be sent. For example, if the threshold is 5, then all messages with an ROI over 5 (or at least 5) would be sent while messages less than 5 would not be sent (and thus can be discarded).

In another embodiment, a queue can be kept of the set of potential messages which is sorted in order of highest ROI score to lowest (or best to worst). As many messages from the set from the beginning of the queue are sent as are allowed. For example, Table I below represents a set of 8 potential messages (each identified by a message ID number) and each message's ROI score.

TABLE I

| Message ID# | ROI score |
| --- | --- |
| 1 | 4.2 |
| 2 | 2.1 |
| 3 | 4 |
| 4 | 5.9 |
| 5 | 1.1 |
| 6 | 0 |
| 7 | 7 |
| 8 | 5 |

This set can be sorted in order of ROI score, as per Table II.

TABLE II

| Message ID# | ROI score |
| --- | --- |
| 7 | 7 |
| 4 | 5.9 |
| 8 | 5 |
| 1 | 4.2 |
| 3 | 4 |
| 2 | 2.1 |
| 5 | 1.1 |
| 6 | 0 |

Assuming the social networking site only allows the application 4 application to user messages at this time. The application would send messages with ID numbers 7, 4, 8, 1 and the remaining messages (3, 2, 5, 6) would not be sent and can either be discarded or saved for use in another set ranking (the same operation all over again at a later point in time).

In a further embodiment, a rolling queue can be kept of the set of potential messages which is sorted in order of highest ROI score to lowest. The front messages in this queue are continuously sent until the applications allotment of application to user messages is used up, upon which no further messages are sent until new application to user messages are granted again. For example, as applied to Table II, a new queue (illustrated in Table III) can be generated.

TABLE III

| Message ID# | ROI score |
|---|---|
| 3 | 4 |
| 2 | 2.1 |
| 5 | 1.1 |
| 6 | 0 |

Table III represents the queue from Table II with all of the highest ROI messages sent until the application no longer has any new application to user messages available. The application would typically get a new "bucket" of application to user messages periodically (e.g., daily), and upon the next time the application has more potential application to user messages to send the same process can be repeated with new entries in the queue representing the new potential messages that were generated since the last time that the application to user messages were sent. For example Table IV represents the queue from Table III but updated to reflect newly generated potential messages.

TABLE IV

| Message ID# | ROI score |
|---|---|
| 3 | 4 |
| 2 | 2.1 |
| 5 | 1.1 |
| 6 | 0 |
| 9 | 3 |
| 10 | 9 |
| 11 | 0.5 |

The queue in Table IV can be sorted in order from highest (best) ROI to lowest (worst) as before, resulting in Table V below.

TABLE V

| Message ID# | ROI score |
|---|---|
| 10 | 9 |
| 3 | 4 |
| 9 | 3 |
| 2 | 2.1 |
| 5 | 1.1 |
| 11 | 0.5 |
| 6 | 0 |

Now assuming the social networking site only gives the application a bucket of 2 further application to user messages, then the first two in the queue (message ID #s 10 and 3) can be sent (which are removed from queue). This process can be continuously repeated. Thus, each potential message is added to the queue and sorted based on each message's computed ROI, messages are sent whenever the application is permitted to send messages and they are sent in the order of the queue. This process is continuously repeated. In this way, the more important messages are sent before the less important messages, but the less important messages may still have a chance to be sent depending on their relative importance to the other potential messages (and the amount of application to user messages the application is permitted). If there are lesser messages in the queue than the number of application to user messages allowed for that time then of course all of the messages in the queue would be sent (and the queue would be cleared).

Figure 5:
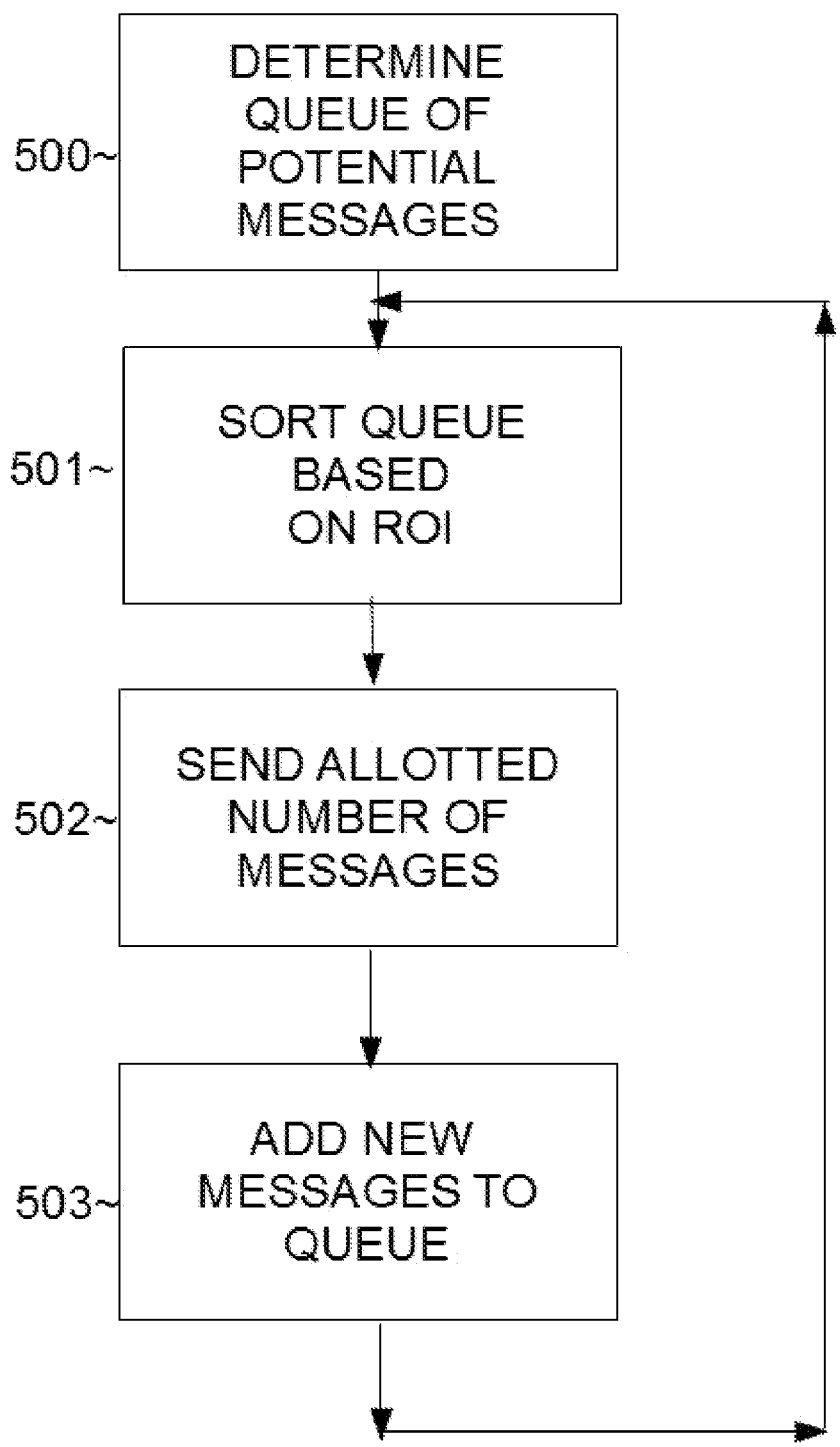
FIG. 5 is a flowchart illustrating an exemplary method of delivering messages using a prioritized queue, according to an embodiment.

FIG. 5 is a flowchart illustrating an exemplary method of delivering (application to user) messages using a prioritized queue, according to an embodiment.

The method begins with operation 500, which determines a queue of potential (application to user) messages. This can be done as described herein, e.g., code in the application server is executed to generate automatic messages from a template. All of these messages are placed in a data structure such as queue.

From operation 500, the method proceeds to operation 501, wherein the queue is sorted based on each message's ROI (which can be determined as described herein).

From operation 501, the method proceeds to operation 502, which sends an allotted number of messages from the queue (in the order in the queue starting with the most important). The allotted number of messages is the current amount of application to user messages the application is currently allowed to send.

From operation 502, the method proceeds to operation 503, which adds new application to user messages to the queue as they are being generated. The method can then return to operation 501 which repeats the sequence. The new messages are integrated into the queue, sorted, and potentially sent based on their position in the queue, and so on.

The application (the game is a possible application) described herein can be hosted on one or more servers which are running in coordination with a separate set of servers hosting the social networking site.

Figure 6A:
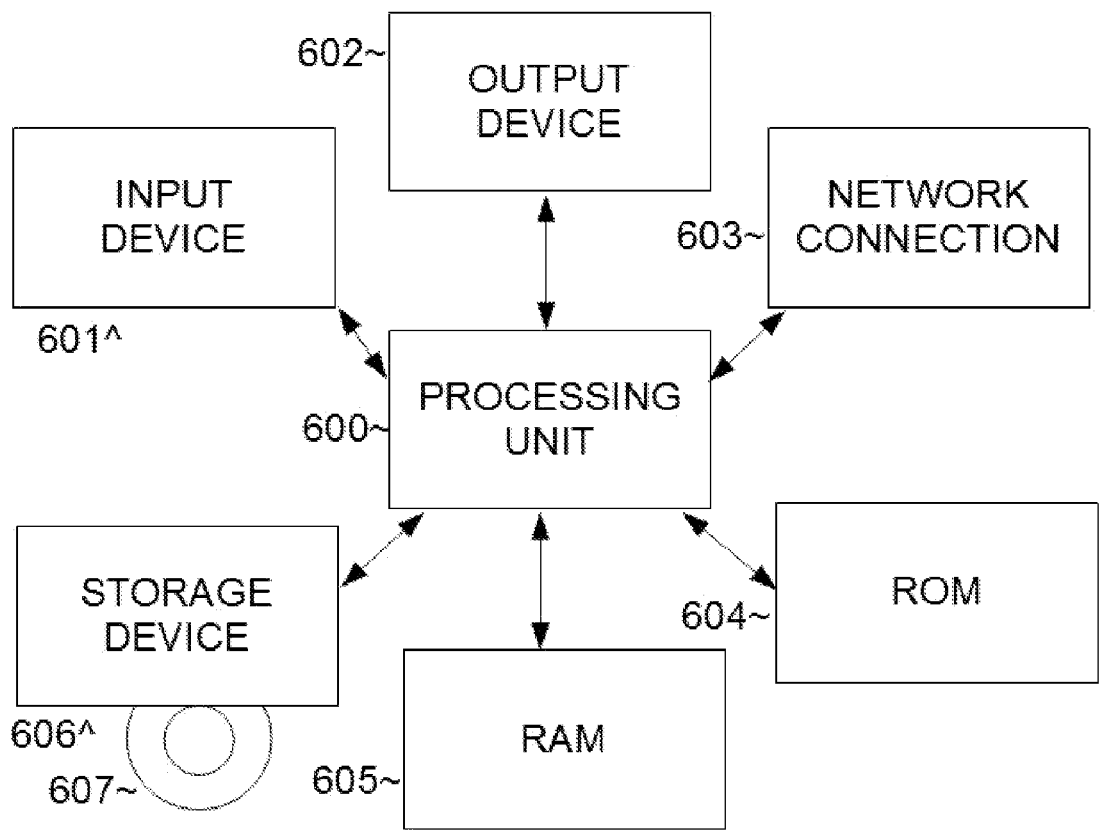
FIG. 6A is a block diagram illustrating exemplary hardware that can be used to implement the game described herein, according to an embodiment.

FIG. 6A is a block diagram illustrating exemplary hardware that can be used to implement any and all methods described herein, according to an embodiment. The hardware in FIG. 6A can be used to implement a computer implementing the system/features described herein and/or a server that is serving the game to a computer which is displaying the game to a player. Such a server can interface with a social networking site (e.g., FACEBOOK, MYSPACE, etc.) that is used to coordinate the entire game and communicate with the players as well as a server used by the social network site.

A processing unit 600 can be a microprocessor and associated structure (e.g., bus, cache, clock, etc.) which can be connected to an input device (e.g., touch-screen, keyboard, mouse, buttons, etc.) which can be used to receive any needed input from the player, and an output device (e.g., touch-screen, CRT, monitor, etc.) which can be used to display any output to the player. The processing unit 600 can also be connected to a network connection 603 which can connect to a computer communications network such as the Internet, Wi-Fi, LAN, WAN, etc. The processing unit 600 can also be connected to a ROM 604 and a RAM 605 as used in the art. The processing unit 600 can also be connected to a storage device 606 which can be nonvolatile storage device (e.g., BLU-RAY drive, CD-ROM drive, hard drive, EPROM, etc.) A computer readable medium 607 (e.g., BLU-RAY disc, CD-ROM, hard disc, etc.) can be read by the storage device 606 and can store programs and assets that can cause the processing unit 600 to perform any of the methods described herein. The ROM and RAM can also be loaded with instructions that can cause the processing unit 600 to perform any of the methods described herein.

Figure 6B:
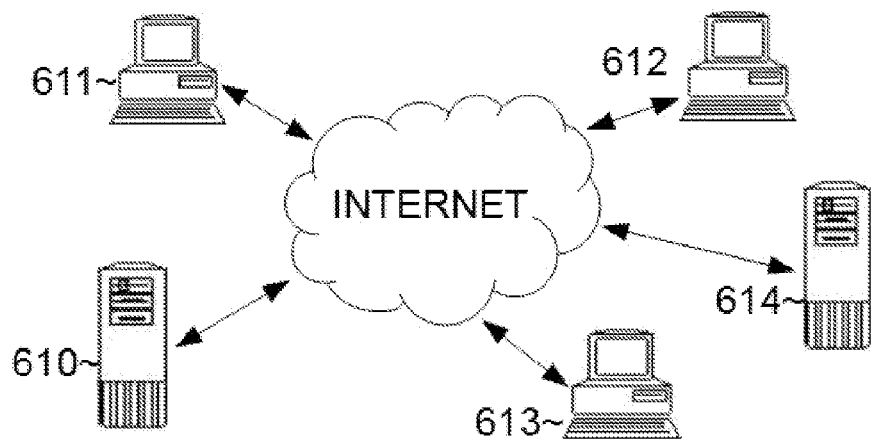
FIG. 6B is a network diagram showing a network structure for a social networking web site and players, according to an embodiment.

FIG. 6B is a network diagram showing a network structure for a social networking web site and players, according to an embodiment.

A computer communications network (such as the Internet) can be used to connect a host server 610 which can host and serve a social networking site. Note that while FIG. 6B shows only one server as the host server 610, the host server 610 can encompass numerous servers (or processors, etc.) all cooperating with each other (whether in the same physical location or not) to implement any and all of the methods described herein. The host server 610 communicates with players 611, 612, 613 through the Internet (or other computer communication network) and can implement any of the methods herein by executing computer code programmed accordingly. Game server 614 can also implement all games and methods described herein on the site by executing computer code programmed accordingly. The game server 614 is connected to the Internet and can communicate with all of the players 611, 612, 613 directly or indirectly through the social networking site hosted by the host server 610. The game server 614 can cooperate with the host server 610 so that the games run on the game server 614 can be integrated into the social networking site hosted by the host server 610. The game server can also be optional and all of the games can be also hosted on the host server 610, whereby the integration of the games served/hosted by the game server 614 will appear embedded in the social networking site hosted by the host server 610 such that players would typically not realize (or care) that multiple servers are cooperating in order to play games on the social networking site. All of the communications described herein can be effectuated using such a network configuration. Typically, the communications are effectuated on the social networking site itself, thus the players 611, 612, 613 should be logged into the social networking site in order to participate herein, although logging in is not required (e.g., communications can be transmitted using other methods, such as email, IRC chat, instant message, etc.) The host server 510 can communicate with any of the devices illustrated in FIG. 1.

All components herein can be distributed across different such components as needed. For example, a single server as mentioned herein can be distributed across numerous different servers and locations. A processor (or processing unit) can also be distributed across multiple processors in a same or different computer (at a same or different location). The electronic components described herein represent an abstraction but it can be appreciated that the computer systems implementing the methods herein can be more numerous and interconnected than illustrated herein.

If a player is playing the game described herein on a social networking site or other type of hosted environment, then the player's computer would cooperate with the social networking server in order to present the game to the player. The player's computer would perform the instructions necessary to display the game while the remote server can determine the results (e.g., the final arrangement) and communicate this result via the Internet to the player's computer so that the player's computer can accurately display the result. The remote server may track and account for all credits wagered and won/lost while the player's computer can display the amount of credits owned or won at the direction of the remote server so the player cannot tamper with these amounts. All games described herein are considered to be played on the site described herein.

Any description of a component or embodiment herein also includes hardware, software, and configurations which already exist in the prior art and may be necessary to the operation of such component(s) or embodiment(s). All variables and values described herein can take on any numerical value, including zero or values greater than zero.

Further, the operations described herein can be performed in any sensible order. Any operations not required for proper operation can be optional. Further, all methods described herein can also be stored on a computer readable storage to control a computer. All features described herein (including all documents incorporated by reference) can be combined with one another without limitation. While the "credits" are used herein to refer to awards provided to players typically refers to non-cash value credits, this can also refer to cash credits as well (that are directly redeemable for cash).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method to implement a messaging system in an application, the method comprising:
    determining a plurality of application to user messages each with an intended recipient;
    computing a score for each of the plurality of application to user messages; and
    delivering utilizing a social networking platform an approved subset of the plurality of application to user messages but not a remaining set of the plurality of application to user messages, the approved subset not comprising all of the plurality of application to user messages, the approved subset determined as the plurality of application to user messages all with a higher score than the remaining set, while the remaining set is never delivered, the approved subset limited to an allotted number of messages.

2. The method as recited in claim 1, wherein a plurality of the remaining set of the plurality of application to user messages is delivered at a later time later than the delivery of the approved subset of the plurality of application to user messages, the later time not being contemporaneous with the delivery of the approved subset.

3. The method as recited in claim 1, wherein the score for a message is determined based on a value of the message's intended recipient.

4. The method as recited in claim 3, wherein the score for a message is determined based on the message's intended recipient's number of friends.

5. The method as recited in claim 3, wherein the score for a message is determined based on an amount of real money the message's intended recipient has spent in the application.

6. The method as recited in claim 3, wherein the score for a message is determined based on a number of friends the message's intended recipient has invited to the application.

7. The method as recited in claim 1, wherein the score is determined using a category of the message's content.

8. The method as recited in claim 1, wherein the score is determined using a combination of a value of the message's intended recipient and a category of the message's content.

9. A method to implement a messaging system in an application, the method comprising:
    determining a plurality of application to user messages each with an intended recipient;
    computing a score for each of the plurality of application to user messages;
    ranking the plurality of application to user messages based on their respective score; and
    delivering utilizing a social networking platform an approved subset of the plurality of application to user messages in an order based on the ranking, the approved subset limited to an allotted number of messages and comprising the plurality of application to user messages with a highest score.

10. The method as recited in claim 9, wherein the score for a message is determined based on a value of the message's intended recipient.

11. The method as recited in claim 10, wherein the score for a message is determined based on the message's intended recipient's number of friends.

12. The method as recited in claim 10, wherein the score for a message is determined based on an amount of real money the message's intended recipient has spent in the application.

13. The method as recited in claim 10, wherein the score for a message is determined based on a number of friends the message's intended recipient has invited to play the application.

14. The method as recited in claim 9, wherein the score is determined using a combination of a value of the message's intended recipient and a category of the message's content.

15. An apparatus to implement a messaging system in an application, the method comprising:
   a network connection; and
   a server connected to the network connection, the server configured to:
   determine a plurality of application to user messages each with an intended recipient;
   compute a score for each of the plurality of application to user messages;
   rank the plurality of application to user messages based on their respective score; and
   delivering utilizing a social networking platform an approved subset of the plurality of application to user messages in an order based on the ranking the approved subset limited to an allotted number of messages and comprising the plurality of application to user messages with a highest score.

16. The apparatus as recited in claim 15, wherein the server is further configured such that the score for a message is determined based on a value of the message's intended recipient.

17. The apparatus as recited in claim 15, wherein the server is further configured such that the score for a message is determined based on the message's intended recipient's number of friends.

18. The apparatus as recited in claim 15, wherein the server is further configured such that the score for a message is determined based on an amount of real money the message's intended recipient has spent in the application.

19. The apparatus as recited in claim 15, wherein the server is further configured such that the score for a message is determined based on a number of friends the message's intended recipient has invited to play the application.

* * * * *